Dec. 8, 1942.  E. W. MILLER  2,304,586
HOB FOR GENERATING CROWN GEARS
Filed Dec. 14, 1940   2 Sheets-Sheet 2
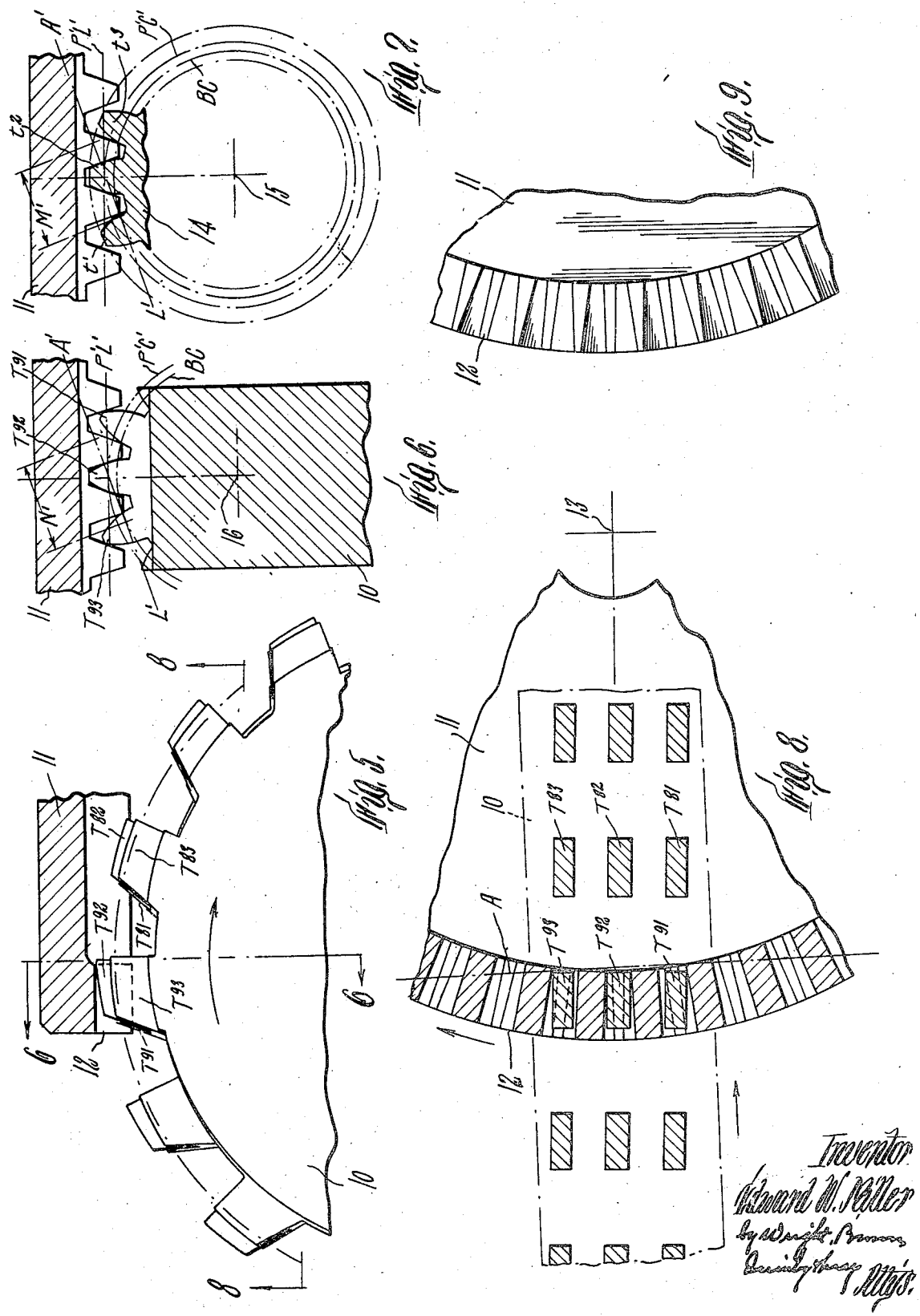

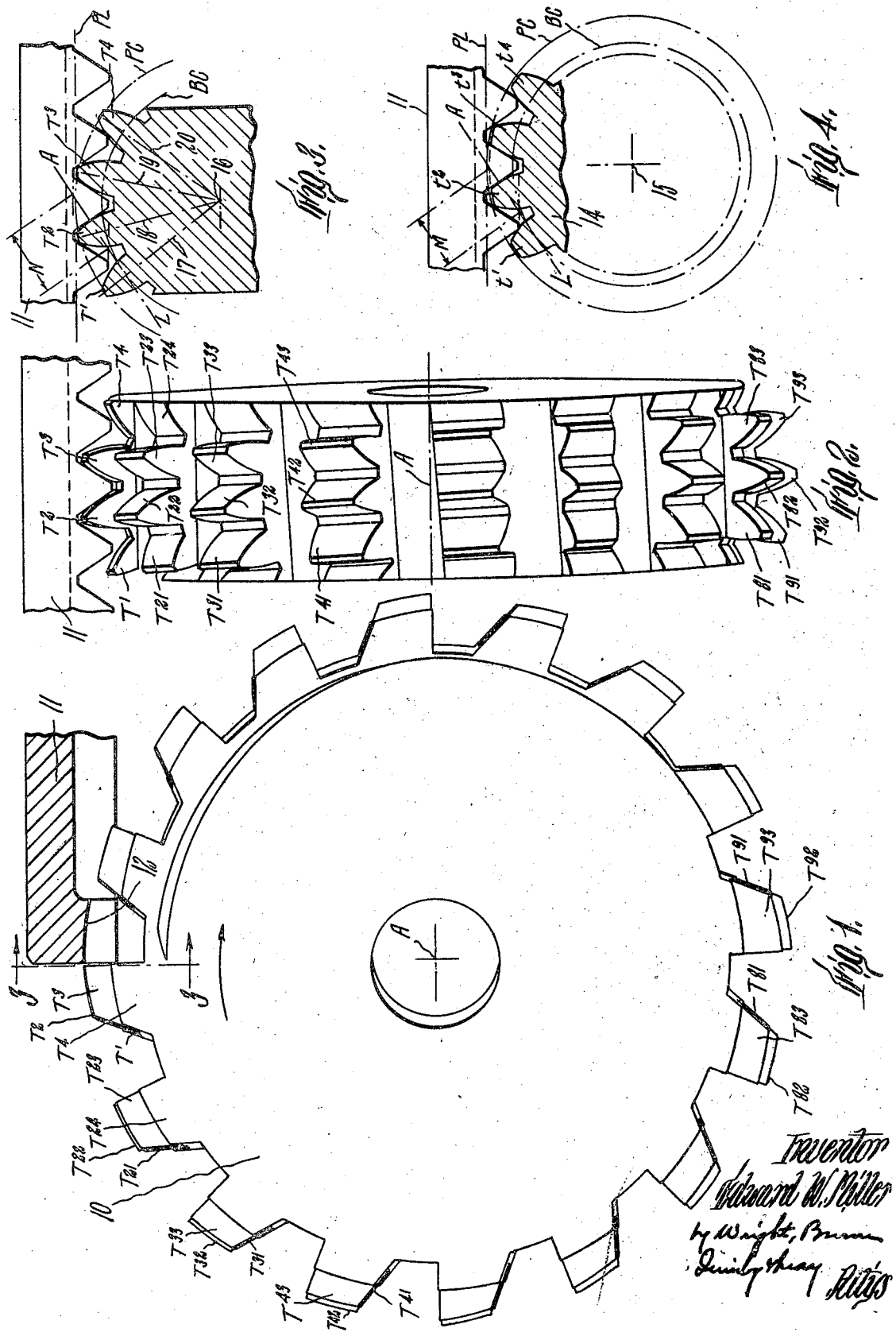

Patented Dec. 8, 1942

2,304,586

UNITED STATES PATENT OFFICE 2,304,586

HOB FOR GENERATING CROWN GEARS

Edward W. Miller, Springfield, Vt., assignor to The Fellows Gear Shaper Company, Springfield, Vt., a corporation of Vermont Application December 14, 1940, Serial No. 370,212

11 Claims. (Cl. 29—103)

This invention relates to cutting tools of the type known as hobs, and is particularly concerned with a hob intended, adapted and capable of generating crown gears. Hobs embodying the new characteristics of the invention are capable of generating other forms of gear as well, including spur gears, external helical gears, and internal gears of both straight toothed and helical toothed character. The title "Hob for generating crown gears" has been chosen, and the following description is directed particularly to the use of the hob in producing crown gears, because hobs embodying this invention are the first ever to be furnished, to the best of my knowledge and belief, by which true and accurate crown gears may be generated in blank work pieces. This explanation is given to make clear that the present emphasis on the crown gear generating capabilities of the invention is not to be construed as a limitation.

It is an object of this invention to provide a tool capable of accurately generating crown gear teeth while being driven continuously in the same direction, i. e., by rotation about an axis, whereby a larger number of teeth are available for performing the cutting action, and individual teeth are entered into the work for shorter units of time in each cycle, than is the case when crown gears are generated by cutters of other types. In the fulfillment of this object I have produced a tool equipped with cutting teeth located in a number of convolutions around its geometrical axis, with suitable lead between adjacent convolutions, and otherwise formed and arranged to generate crown gear teeth conjugate to the teeth of a cylindrical pinion or gear wheel when rotated about such axis. I have called this tool a "hob" because its teeth are disposed in a generally helical line of several convolutions, and to that extent it is analogous to the conventional hob, although in other respects it differs radically.

A form of crown gear generating hob embodying this invention, and capable of producing radial teeth in crown gears and straight teeth in cylindrical gears, is shown in the drawings and is hereinafter described in detail.

Fig. 1 shows the hob in end view, operating on a crown gear of which a fragment is shown in section;

Fig. 2 is a side view of the hob and adjacent fragment of the crown gear as viewed from the left of Fig. 1;

Fig. 3 is a radial section of the hob taken on line 3—3 of Fig. 1, showing its relationship to the crown gear teeth being cut at the outer circumference of the zone containing such teeth;

Fig. 4 is a sectional view of a pinion conjugate to the same crown gear and in mesh with the teeth thereof as seen from a viewpoint corresponding to that of Fig. 3;

Fig. 5 is a view showing a fragment of the same hob in its full depth cutting engagement with the inner circumference of the tooth bearing zone of the crown gear;

Fig. 6 shows a section of the hob and adjacent part of the crown gear taken on line 6—6 of Fig. 5;

Fig. 7 is a view of the pinion shown in Fig. 4 in its mesh with the inner ends of the crown gear teeth;

Fig. 8 is a sectional view of the hob teeth and of the crown gear teeth generated thereby taken on line 8—8 of Fig. 5, with the hob teeth represented as though the curve on which the section is taken were developed into a plane parallel to the work gear;

Fig. 9 is a face view of a fragment of the crown gear cut by means of the hob illustrated in the preceding figures.

Like reference characters designate the same parts wherever they occur in all the figures.

The hob as a whole is designated by the reference number 10. The line A designates its geometrical axis, about which it rotates when in operation. Its principal new characteristic resides in the fact that its teeth, in planes normal to the convolutions in which they are disposed (or, in some cases, in radial planes of the hob) have an arrangement, form and spacing substantially identical with the teeth of a pinion conjugate to the crown gear to be produced. To make this fully clear, an illustrative crown gear and conjugate spur pinion are shown in the drawings and will now be described.

The crown gear 11 is fashioned with a coaxial annular rib 12 on one end face constituting the tooth bearing zone. Its center is indicated at 13 in Fig. 8. It may be assumed that such crown gear is designed to rotate, when in use, around an axis passing through said center perpendicular to the plane of the gear, and to mesh with spur gears and pinions, when such a gear or pinion is mounted with its axis perpendicular to, and intersecting, the crown gear axis.

A conjugate pinion 14 with center at 15, having involute teeth $t'$, $t^2$, $t^3$, $t^4$, etc., of which the face curves are generated from the base circle BC, is shown in Figs. 4 and 7. With outside diameters of crown gear and pinion, diameter of base circle, and radial width of the rib or zone 12 as here shown, the pinion meshes with the outer ends of the crown gear teeth on a pitch line PL of the crown gear, and a pitch circle PC of the pinion (Fig. 4). The line of action of this portion of the crown gear and pinion teeth is designated by the line LA, and the length of action by the dimension M. At the inner ends of the crown gear teeth (the inner circumference of rib 12), the same teeth run in mesh on pitch circle P'C' and pitch line P'L', with a line of action L'A' and a length of action M', as shown by Fig. 7; while at intermediate points along the length of the intermeshing teeth, the pitch lines are at intermediate distances from the center 15 of the pinion, and the lines of action lie at inclinations intermediate between those of LA and L'A'.

Referring now to Fig. 3, which shows a section of the hob on a plane normal to the helical alinement of its teeth and coinciding with the cutting ends of teeth in the several convolutions of the helix, it is pointed out that the teeth $T^1$, $T^2$, $T^3$ and $T^4$, in their intersections with such plane, are spaced apart, with equal center spacing on a circular arc BC, of which the radius is the same as that of the base circle BC in Figs. 4 and 7, and the center 16 is located between the ends of the hob at such distances from the ends as enables a sufficient number of teeth to be properly disposed on the base circle arc to generate completely the tooth faces of the work gear. Ordinarily the location is approximately midway between the ends of the hob, and it is so shown here. The median lines 17, 18, 19 and 20 of these teeth are radial to the center 16 and the sides of the teeth are involutes of the base circle BC. In other words, their arrangement in this plane is identical with that of the pinion teeth $t^1$, $t^2$, $t^3$ and $t^4$, in planes normal to the axis of the pinion, but they differ from the latter teeth in having longer addenda at their cutting ends, for the purpose of cutting clearances in the work piece, in being segments of helical convolutions around the axis of the hob, and in having relief or clearance on their sides and crests similar to the clearance of standard hob teeth. All teeth in other normal planes are similarly related (with differences of angular displacement due to their helical arrangement) to a base surface, which is a toric surface generated by revolution of the arc BC around the hob axis A, and to a center lying in a circumference through the point 16 around the axis A in a plane perpendicular to such axis. Corresponding teeth in different normal planes, such as the teeth $T^1$, $T^{21}$, $T^{31}$, etc., follow one another in a helix, or helices, around the axis A, the lead of which is equal to the spacing between two teeth in the same normal plane, or a multiple of such spacing. As a matter of convenience the spacing between the teeth circumferentially of the hob is such as to bring the teeth of adjacent convolutions beside one another in rows extending axially of the hob. This, however, is not a limiting factor.

The hob teeth may be considered as segments (modified by side clearance) of helicoids generated by the teeth of a spur pinion of infinitesimal thickness revolved around the axis of the hob with its plane always normal to the helical alinement of the hob teeth and its center at a uniform distance from the hob axis, while being simultaneously rotated about its own center with equal increments of rotation in the course of equal increments of revolution around the hob axis. The median helicoids of such hob teeth contain the median lines 17, 18, 19 and 20 shown in Fig. 3 and all converge in the locus of the center 16 around the hob axis.

Preferably the teeth are located in a single leaded helix, although this is not a limiting factor and they may be arranged in two or more intertwined helices. Preferably also the radius of the hob is considerably larger than the radius of the base circle curve BC. By employing a hob of large diameter and a single helical line of teeth, the angle of the helix may be kept relatively small with respect to planes perpendicular to the axis. However, wide variations in these particulars are possible within the scope of the invention. On the one hand the tool may be as large in diameter as permitted by the dimensions of the machine in which it is to be used, while on the other hand its smaller limit of diameter is that which brings the center of base line curvature in the geometrical axis of the hob. In other words, the hob may be generated as the equatorial segment of a sphere, subject to limitations of pitch and height of the teeth such as will permit of proper cutting action. The limits of radius of base surface curvature around the locus of the center 16 are those of the pinions or gears which will mesh with the crown gears to be produced. Within the limits thus indicated cutters made according to this invention may have any dimensions and their teeth may be of any desired pitch spacing, dimensions and pressure angle. A cutter having the characteristics described is available for cutting crown gears of different radius, all of which will mesh with pinions and gears having teeth of the same pitch and pressure angle as the cutter teeth.

Due to the characteristics of the tool herein described, the convolutions surrounding the axis in which successively acting teeth are arranged differ from the conventional helix. For instance, if such convolutions are spaced apart equally on a curved transverse pitch line, such as the line PC, their projections on a coaxial cylinder have varying, or unequal, leads. And it is not essential that the lead be uniform on such a curved line. Hence, the terms "helix" and "helical" are used in this specification in a generic sense as indicating that such tooth convolutions are analogous to the conventional helix in that they surround the axis with spaces, i. e. a lead, between adjacent convolutions. These terms embrace all tooth arrangements like or equivalent to that here illustrated, for the purposes set forth and analogous purposes, whether the lead is constant or variable.

The cutter hereinbefore described, when put to use for generating crown gears with radial teeth, is set up in proper cutting relation to the rib 12 of the gear blank, with its median plane offset from the axis of the blank sufficiently to bring the teeth midway between its ends substantially radial of the blank when in the cutting zone of their orbit. The hob is rotated about its own axis rapidly, and is fed at a suitable cutting speed toward the axis of the blank. At the same time the blank is rotated at a speed corresponding to the helical lead of the hob teeth. For cutting spiral or offset crown gear teeth, and also for cutting gears of cylindrical character, the hob is otherwise arranged, as later appears.

As the feed progresses, the teeth in the mid zone of the cutter, such as those designated $T^2$ and $T^3$ in Fig. 2, first enter the work. Following rows of teeth, such as those designated $T^{21}$, $T^{22}$, $T^{23}$, $T^{24}$; $T^{31}$, $T^{32}$, $T^{33}$, etc. come into action successively, each succeeding tooth in the same helix, as $T^{21}$, $T^{13}$, $T^{41}$, etc. being displaced from the preceding tooth angularly about the locus of centers 16, in the same manner as successive positions of the pinion teeth $t'$, etc. are displaced angularly with rotation of the pinion. Consequently the cutter teeth generate teeth in the crown gear of the same form as would be molded by the pinion if the crown gear were made of plastic material and the pinion of hard material.

In Figs. 1, 2 and 3 the cutter is shown at the stage when the diameter of the cutter perpendicular to the direction of feed has been brought to the outside circumference of the gear blank. At that stage the outer ends of the gear teeth and tooth spaces have been completely generated. The curved arrangement of the cutter teeth in the radial planes of the cutter causes, in effect, the same action as though they were rolled into and out of action with the gear on pitch lines PC and PL along a line of action LA, like the corresponding lines shown in Fig. 4, but with a length of action N which is longer than the length of action M due to the longer addendum of the cutter teeth.

When the cutter reaches the position shown in Figs. 5, 6 and 8, its diameter perpendicular to the line of feed has reached the inner circumference of the tooth bearing zone 12, and its teeth mesh with the crown gear teeth on pitch lines $P'C'$, $P'L'$ and a line of action $L'A'$ corresponding to the same lines shown in Fig. 7, and with a length of action N'. At this stage the gear is finished. These latter figures show the cutter with an angular displacement of 180° about its own axis from the position shown in Figs. 1, 2 and 3, the teeth $T^{91}$, $T^{92}$ and $T^{93}$ being shown as in mesh with the gear.

The paths of the teeth in each group, relative to the gear blank while passing through the tooth bearing zone thereof, are similar to those of the teeth of a gear shaper cutter in the course of a single cutting stroke, except that they are curved around the axis of the hob instead of being in nearly straight lines. The passage subsequently of each following group of teeth then corresponds to successive strokes of a shaping cutter after such a cutter and work piece have turned through angular increments of their generative rotation equal to the lead between the advancing ends of successive teeth of the hob. The generative effect of the cutter is substantially the same, therefore, as that of a gear shaper cutter in cutting crown gear teeth, while the successive groups of teeth follow one another in continuous progression.

Cutters made according to the same general principles, but with differences in helix angle of the lines of teeth, or differing in other details, are applicable to generating crown gears with spiral teeth and to generating cylindrical gears having either external or internal teeth and of which the teeth are either parallel to the axis or helical. As the present invention is concerned with the characteristics and particulars of the new hob as a manufacture, and not with methods of using it or machines for putting it to use, it is unnecesary in this specification to describe or illustrate the different ways in which various embodiments of the invention are applied to serve different uses. It is sufficient for present purposes to say that each specific hob embodying the invention is suitably located with respect to the work, rotated in harmony with the rotating work piece at a suitable speed, and advanced in a direction suitable for performing the work for which it is designed. The present invention comprehends all cutters having the principles or characteristics herein defined, including equivalent variations and modifications thereof, for all purposes to which they may be put.

What I claim and desire to secure by Letters Patent is:

1. A gear generating cutter having groups of teeth on its periphery spaced apart angularly around the axis of the cutter with corresponding teeth in successive groups in generally helical alinement, the teeth of each group being arranged on a curved base line around a center located between the end faces of the cutter, such base line extending in the axial direction of the cutter.

2. A gear generating cutter having cutting means disposed on its circumference in a plurality of convolutions surrounding the axis and spaced apart from each other, the median helicoids of said convolutions being radial to an imaginary surface generated by revolution, about the axis of the cutter, of a circular arc whose center of curvature lies between the end faces of the cutter.

3. A gear generating cutter having circumferential teeth arranged, with spaces between them, in a plurality of helical convolutions of which the median helicoids converge and meet one another between the ends of the cutter, and the side faces of the teeth are symmetrically curved with respect to such median helicoids.

4. A gear generating cutter having circumferential teeth formed as segments of helicoids generated by revolution of a circular gear of infinitesimal thickness around the axis of such cutter while its plane is maintained at all times radial to a point in such axis and normal to the prescribed helix, and while being simultaneously rotated about its own axis; the teeth of said cutter having cutting edges in planes transverse to such helicoids and having side clearance away from such edges.

5. A crown gear generating hob having teeth disposed in helical alinement around the axis of the hob in a plurality of convolutions, said teeth in planes normal to such helical alinement being radial to a point intermediate the ends of the hob and having face curves which are involutes of a base circle centered at such point.

6. A gear generating hob of which the teeth are arranged in a plurality of convolutions around the axis of the hob and teeth in adjacent convolutions are radially disposed with respect to a locus of points equidistant from said axis located between the ends of the hob, and the faces of the teeth are curves generated with respect to base circles centered on such locus.

7. A gear generating cutter having teeth helically disposed on its circumference in a plurality of convolutions, the teeth in different convolutions being radial to points inward from the circumference and between the ends of the cutter.

8. A gear generating cutter having teeth arranged in a plurality of helical convolutions surrounding a toric base surface, the median lines of such teeth being radial to such toric surface.

9. A gear generating cutter having teeth arranged in a plurality of helical convolutions surrounding a toric base surface, the median lines of such teeth being radial to such toric surface, and the convolutions being equally spaced apart from each other along the curvature of the toric surface.

10. A rotatable gear tooth generating cutter having on its periphery groups of teeth spaced angularly about its axis of rotation, the teeth of the several groups being spaced apart in the general direction of said axis on curved base lines in the same direction of which the curvature is similar to the base line curvature of an external gear and the axes are transverse to the cutter axis.

11. A gear generating tool having a cutting helix surrounding the axis of the tool in a plurality of convolutions, the intersections of such convolutions with a plane containing the axis and a diameter of the tool having gear tooth form and being spaced apart on convex curves centered on axes which extend in a direction angular to the axis of the tool.

EDWARD W. MILLER.